April 26, 1966     P. R. IRISH ETAL     3,248,602

METHOD OF SPECTROGRAPHIC ANALYSIS

Filed Oct. 4, 1960     9 Sheets-Sheet 1

INVENTORS
Paul R. Irish
Henry Nikkel
and John B. Freeman
BY Natt M Emery Jr.
ATTORNEY April 26, 1966 P. R. IRISH ETAL 3,248,602
METHOD OF SPECTROGRAPHIC ANALYSIS
Filed Oct. 4, 1960 9 Sheets-Sheet 5

INVENTORS
Paul R. Irish
Henry Nikkel
and John B. Freeman
BY Nat M Emery Jr.
ATTORNEY April 26, 1966 P. R. IRISH ET AL 3,248,602
METHOD OF SPECTROGRAPHIC ANALYSIS
Filed Oct. 4, 1960 9 Sheets-Sheet 7
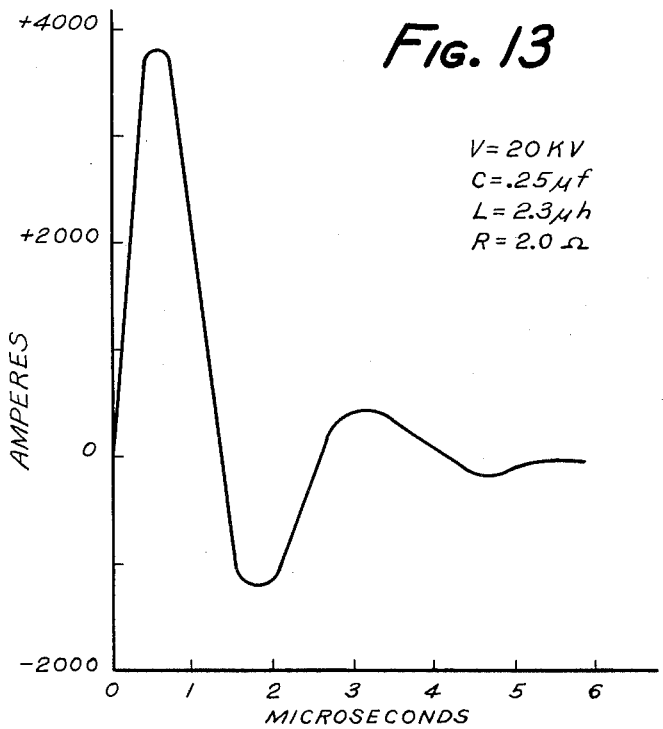
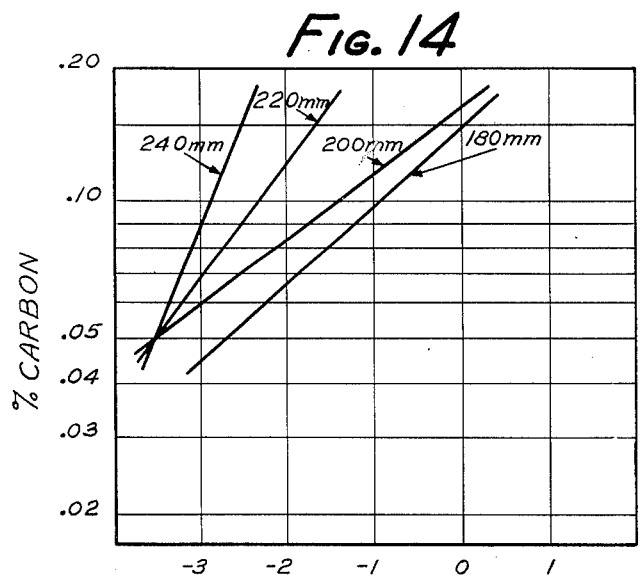
INVENTORS
Paul R. Irish
Henry Nikkel
and John B. Freeman
BY Nat M Emery Jr.
ATTORNEY April 26, 1966 P. R. IRISH ETAL 3,248,602
METHOD OF SPECTROGRAPHIC ANALYSIS
Filed Oct. 4, 1960 9 Sheets-Sheet 9

INVENTORS
Paul R. Irish
and Henry Nikkel
John B. Freeman
BY Natt M Emery Jr.
ATTORNEY

United States Patent Office 3,248,602
Patented Apr. 26, 1966

3,248,602
METHOD OF SPECTROGRAPHIC ANALYSIS
Paul R. Irish and Henry Nikkel, Bethlehem, and John B. Freeman, Allentown, Pa., assignors, by mesne assignments, to Bethlehem Steel Corporation, a corporation of Delaware
Filed Oct. 4, 1960, Ser. No. 60,335
10 Claims. (Cl. 315—111)

This invention relates to spectrochemical analysis. More particularly this invention relates to a new method of spectrochemical analysis for small percentages of carbon in ferrous metals.

It is an object of our invention to excite samples containing carbon in a novel way under new and previously unrealized conditions so that consistent and accurate spectra of the samples may be obtained.

A further object of our invention is to provide a procedure for spectrochemical analysis which includes sparking the sample in such a manner and under such particular atmospheric conditions that a precise and accurate measurement of the quantity of carbon in the sample is possible by appropriate analysis of the spectral radiation.

A further object of our invention is to provide a method of accurately determining the carbon content by spectrochemical means of a steel sample using excitation conditions which will not preclude the determination at the same time of the amounts of other elements in the sample.

The invention will be explained in conjunction with the accompanying drawings, in which.

Figure 4:
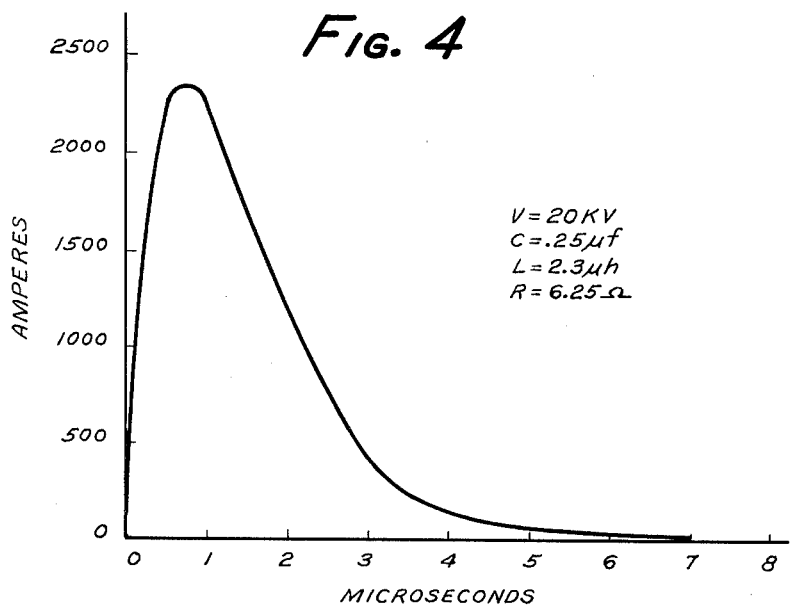

FIG. 4 graphically depicts a critically damped spark current wave used for carbon determinations with current in amperes calibrated along the ordinate and time in microseconds along the abscissa.

Figure 5:
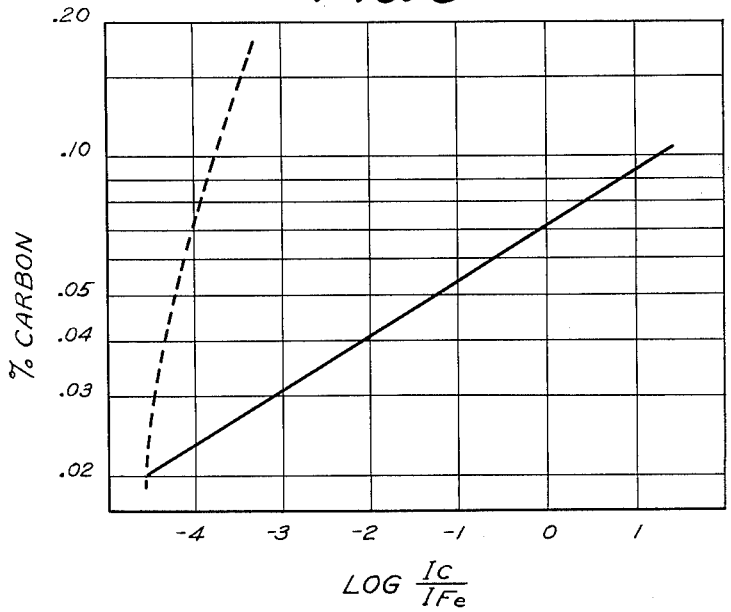

FIG. 5 is an analytical calibration for carbon in plain carbon steel arrived at by using the method of the present invention.

Figure 6:
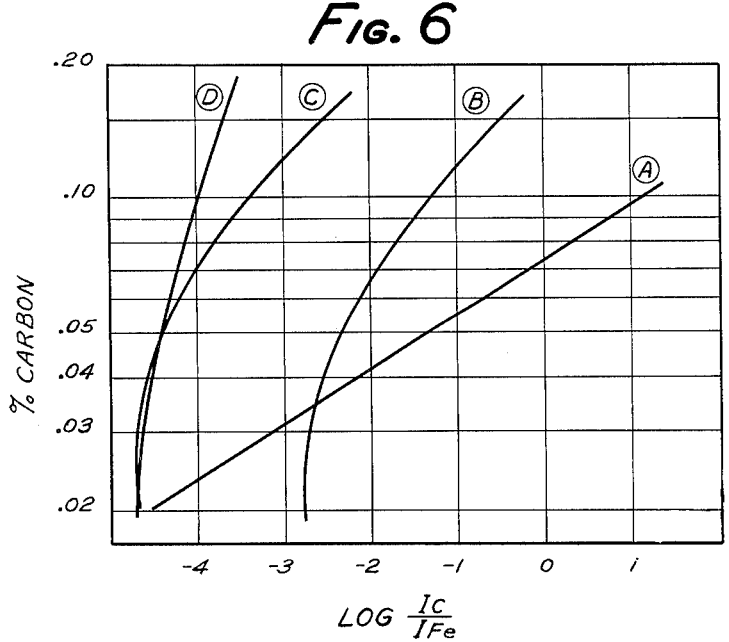

FIG. 6 depicts four analytical calibrations for carbon in plain carbon steel obtained using four different experimental methods and combinations of methods of spectrographic carbon analysis.

Figure 7:
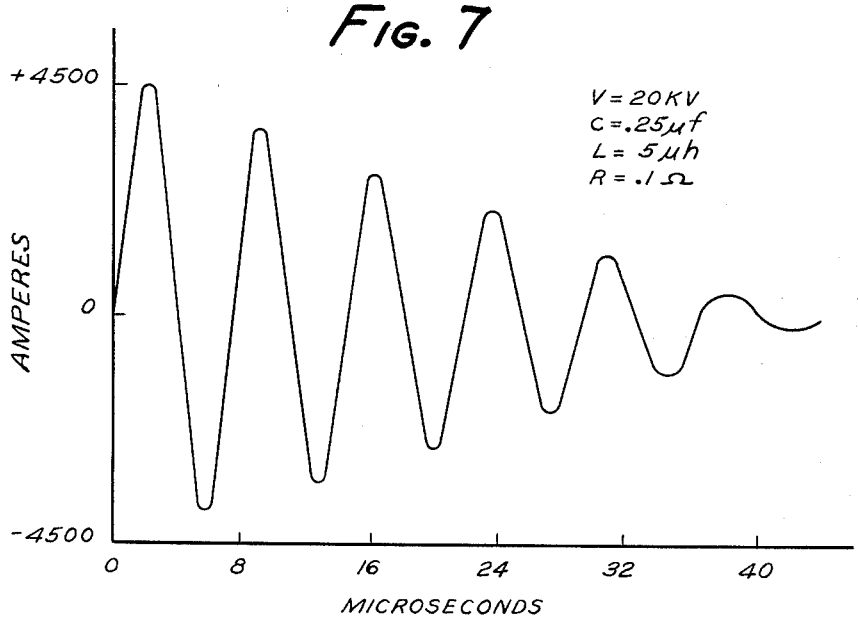

FIG. 7 depicts a high power oscillatory spark current of long duration.

Figure 8:
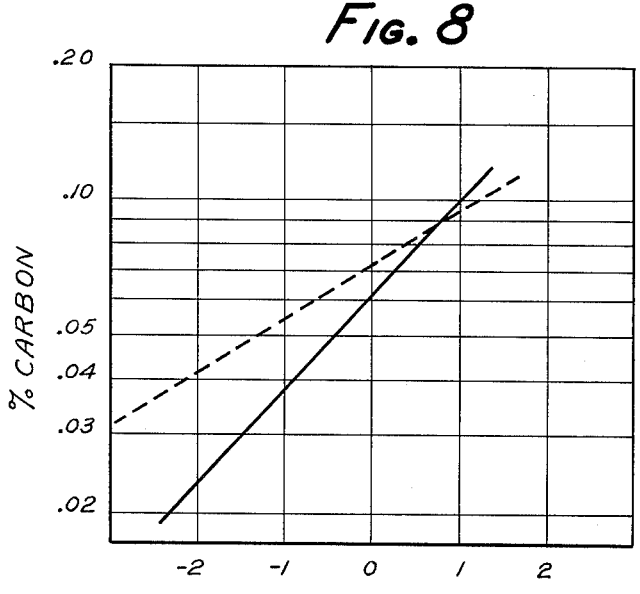

FIG. 8 shows by a solid line the type of analytical calibration curve for carbon obtained by using the high power oscillatory spark excitations shown in FIG. 7.

Figure 9:
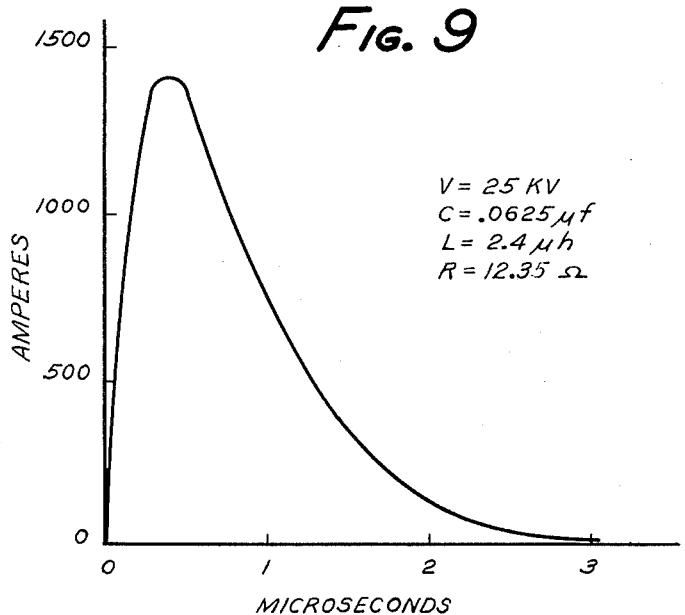

FIG. 9 depicts a critically damped spark current of relatively low amperage and short duration.

Figure 10:
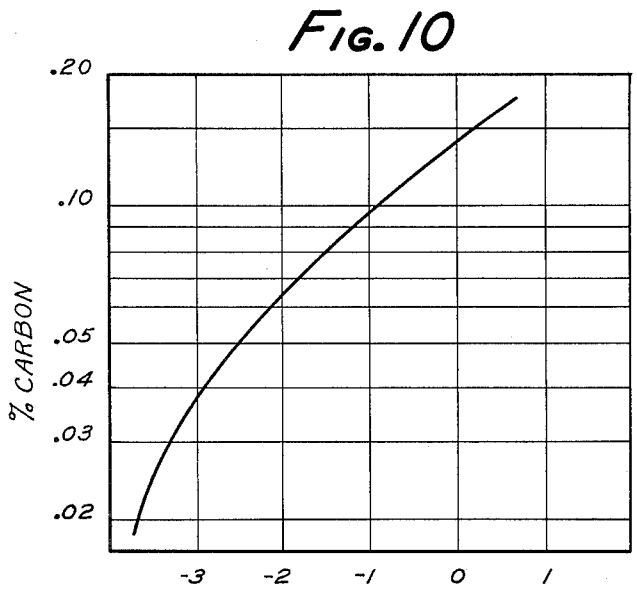

FIG. 10 shows the analytical calibration curve for carbon in plain carbon steel as obained using the critically damped spark current shown in FIG. 9.

Figure 11:
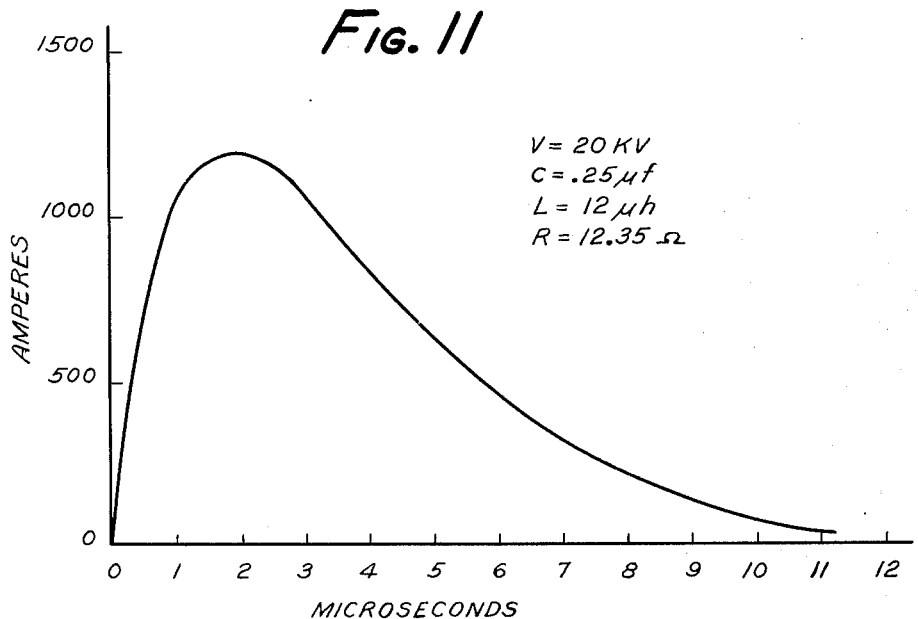

FIG. 11 depicts a critically damped spark current of relatively low amperage and relatively long duration.

Figure 12:
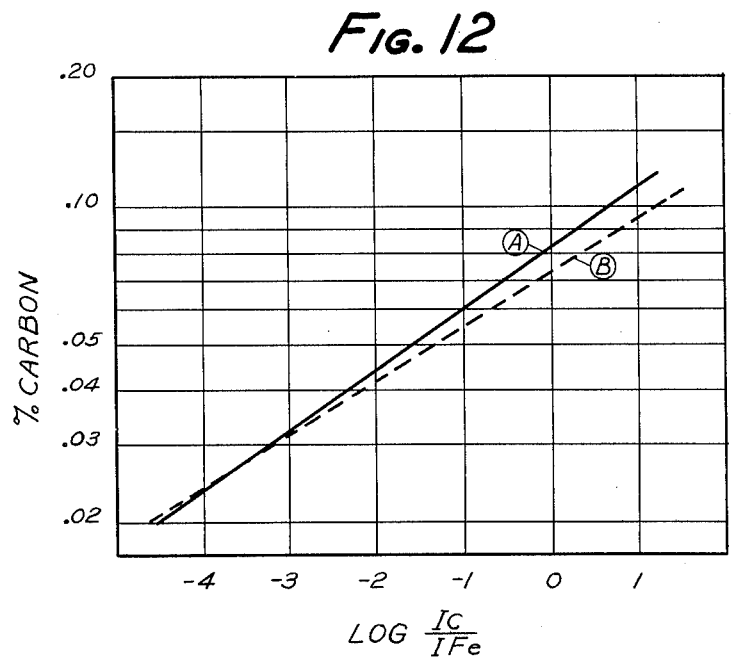

FIG. 12 shows the analytical calibration curve for carbon in plain carbon steel using the excitation obtained with the excitation current shown in FIGURE 11. Curve B is reproduced for comparison and is identical to FIGURE 5.

FIG. 13 depicts a partially damped oscillatory spark current.

FIG. 14 shows analytical calibrations for carbon in plain carbon steel using a nitrogen atmosphere at various pressures.

Figure 15:
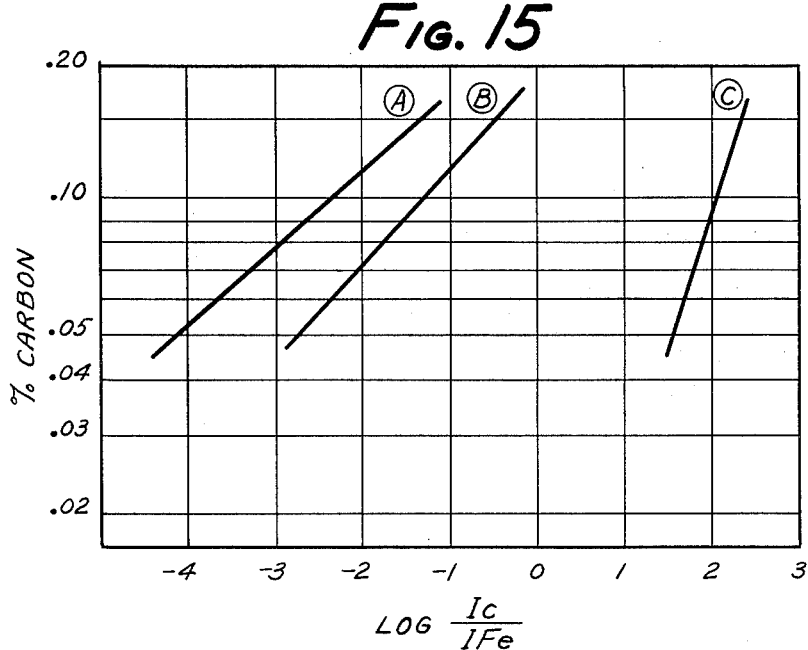

FIG. 15 shows analytical calibrations for carbon in plain carbon steel using a nitrogen atmosphere held at 200 mm. Hg but with various rates of nitrogen flow through a 200 ml. electrode chamber.

Figure 16:
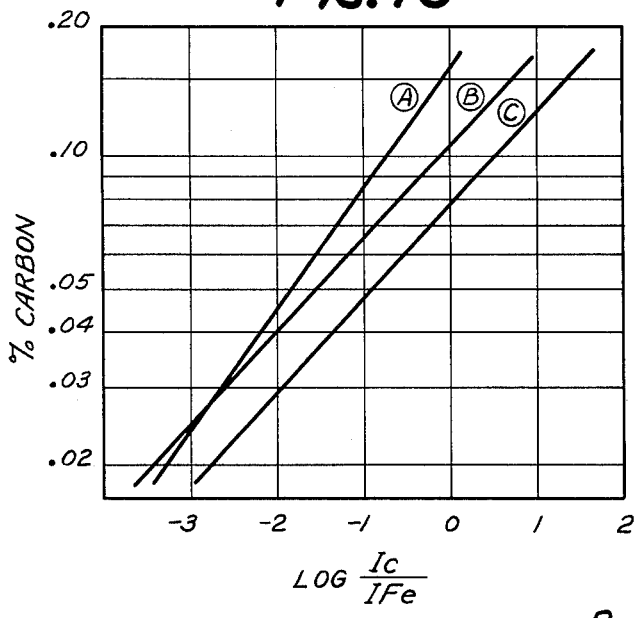

FIG. 16 depicts several analytical calibrations for carbon in plain carbon steel using a helium nitrogen atmosphere contained in a 200 ml. electrode chamber where the nitrogen flow is held at 2 cubic feet per hour and the helium flow is varied.

Figure 17:
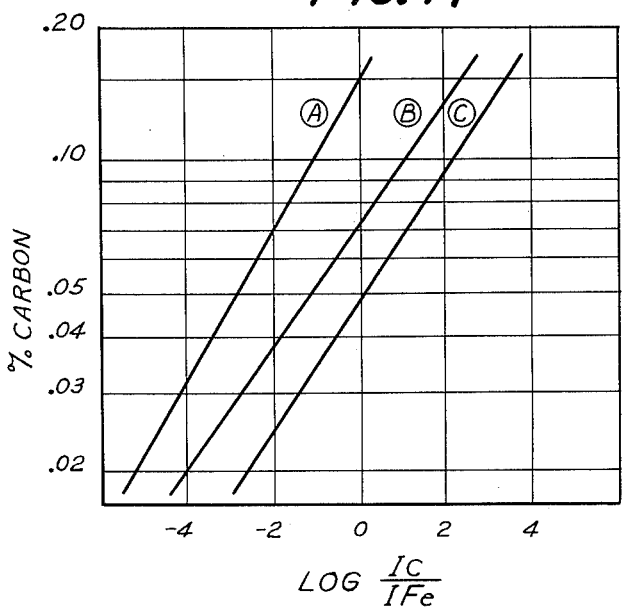

FIG. 17 shows several analytical calibration curves for carbon in plain carbon steel using a helium nitrogen atmosphere in a 200 ml. electrode chamber keeping the helium flow constant at 26 cubic feet per hour and varying the nitrogen flow.

Figure 18:
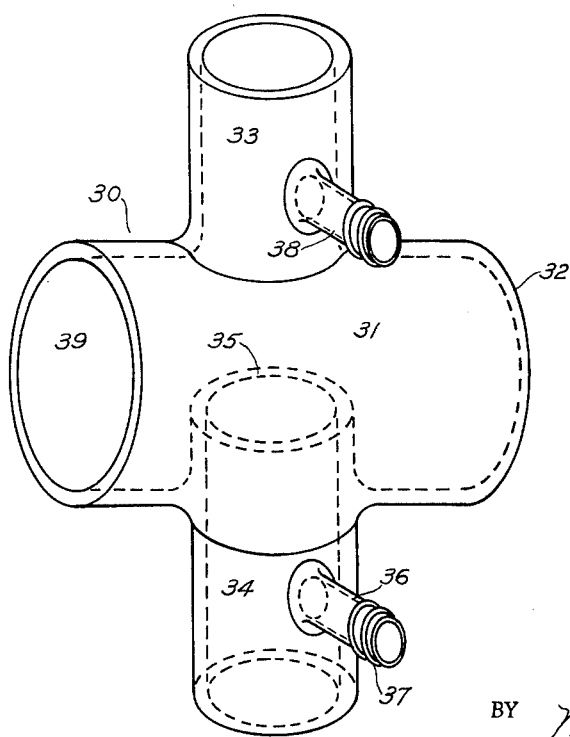

FIG. 18 shows an outer electrode chamber.

Figure 19:
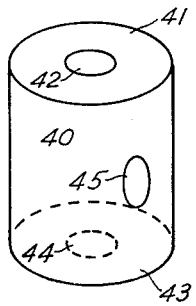

FIG. 19 shows an inner electrode chamber.

Spectrochemical methods of analysis are invaluable in determining the metallic composition of ferrous and nonferrous alloys. Because of the greater speed of this method, compared to chemical analytical procedures, the metallurgical industry has been able to gain closer control of the various metallic alloys during their manufacture. This has resulted in both an increase in production and an improvement in the quality of the alloys produced. Unfortunately, the spectrochemical method has until now been unsuccessful in the determination of carbon, which is the most important constitutent in ferrous alloys.

I. *Difficulties in determining carbon by the spectrochemical procedure*

Carbon is difficult to analyze spectrographically because of the nature of its spectrum.

The electron binding forces associated with carbon are greater than those of the metallic alloying elements in steel. As a result, a large proportion of its spectrum lines are of relatively short wave-length and fall in the vacuum ultraviolet region which is accessible only with difficulty. However, there is no potentially sensitive line that falls in the near ultraviolet region. It is the 2296.86A carbon line which is radiated by the doubly ionized atom. Because of the unique electron structure of the carbon atom and the physical laws governing spectral emission, there is a high probability of this line occurring when the atom is properly excited.

Heretofore, the 2296.86A line has not been used successfully for making a spectrochemical determination of carbon in iron and steel containing less than 0.20% carbon content. The reason has been that the line is still not strong enough in intensity to mask the interfering adjacent spectral lines, which are radiated by other elements found in iron and steel.

Figure 1:
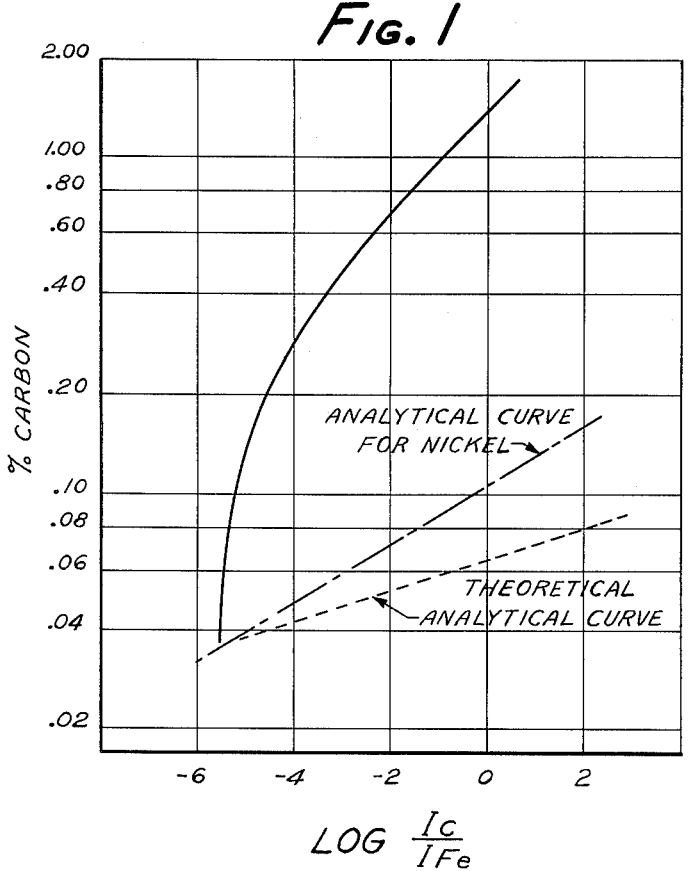
FIG. 1 is a typical analytical calibration diagram as used in spectrochemical analysis.

Furthermore, even a large quartz spectrograph with a linear dispersion of 0.53 mm. per A cannot resolve the carbon line from adjacent interfering iron lines. Thus, any intensity measurement made on the carbon lines will unavoidably include light radiated by the adjacent lines. The problem is further complicated by the diffuse nature of the carbon 2296.86A line, which causes a greater amount of interference than is actually indicated by the wave length separations. This interference leads to insensitive, inaccurate, and, in the case of alloy interference, quite erratic carbon determinations. FIGURE 1 is an analytical calibration curve for carbon in plain carbon steel. The percent of the element is shown on the ordinate and the logarithm of the ratio of the intensity as measured of any given spectral line of the element against some standard line in the same spectrum is shown along the abscissa. The solid curve drawn on the diagram represents a carbon analysis curve for the 2296.86A line of carbon as obtained using conventional spectroscopic equipment and procedure. This curve was obtained using a spectrochemical procedure that gives a satisfactory analysis of iron and steel for the metallic elements. A large quartz spectrograph having a dispersion of 0.53 mm. per A was employed, and the spark circuit used for exciting the spectrum of the samples operated at a peak voltage of 30,000 volts across 0.007 microfarads capacity.

A nickel curve obtained using the same equipment and procedure is drawn in as a dashed line for comparison as is also a line representing the most desirable theoretical slope which a curve could have from an analytical standpoint.

In the carbon calibration curve, it will be noted that the points fall on a smooth curve. This indicates that the error introduced by the interfering iron lines is constant. However, even though constant, this interference gives rise to inaccurate and unusable results because of a loss in sensitivity. Loss in sensitivity is indicated by the steepness of the slope which limits the lower range of carbon determination to 0.20% carbon in plain carbon steel. Obviously, this is a serious limitation because there are a large variety of steel alloys, produced and used in great tonnages, which have carbon contents between the range of 0.02% to 0.20% C. Even at the higher concentrations where determinations can be made, the loss of sensitivity gives rise to results that are too inaccurate to be useful.

Iron interference with the 2296.86A carbon line also reduces the overall sensitivity of the calibration curve to a change in carbon content. The amount of this reduction can be seen by comparing the slope of the carbon calibration with the slope of the nickel calibration and with the best theoretical slope. These two curves are shown for comparison in FIGURE 1. The nickel calibration is for the spectral line 2316.04A, which is close in wave length to the carbon line. It will be noted that the slope of the carbon line is considerably greater than that for nickel. While the slope of the nickel calibration is sufficient to give accurate and precise results, that for carbon is not. Hence, the results obtained with this calibration are unreliable, and thus not suitable for use in determining and controlling the content of this element in iron and steel.

A considerably greater difficulty is encountered in attempting to use the carbon spectral line, 2296.86A, for determining the concentration of this element in iron and steel to which alloys have been added. Spectral lines from both nickel and chromium, two common alloying elements, fall close to the carbon line. As the concentration of these elements varies during refining, and differs for different alloy grades, the amount of interference from the spectral lines of these elements will vary. This variation in interference leads to quite erratic carbon results. In fact, it has not been found possible to obtain a spectrochemical analytical calibration curve for carbon in alloy steels with ordinary techniques.

Notwithstanding these difficulties, the inventors have discovered a successful procedure for the determination of carbon by spectroscopic means.

II. The electrical spark and spectral excitation

Figure 2:
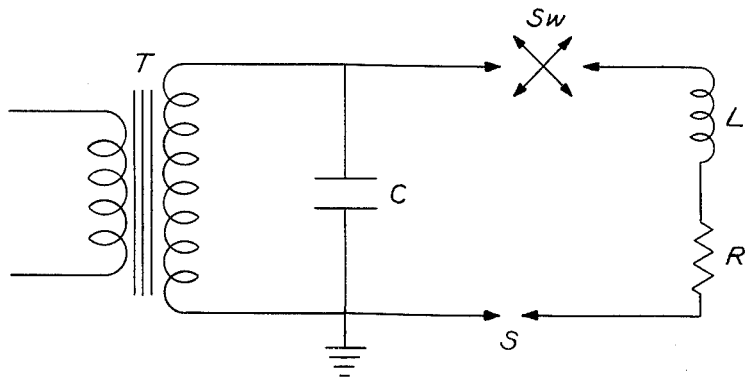
FIG. 2 shows a typical spectrographic spark circuit such as is used in this invention.

A circuit diagram of a typical spark source for spectrochemical analysis is shown in FIG. 2. In operation, the voltage from transformer T, charges the condenser C, to a high potential. The rotating switch SW, operating in synchronism with the alternating potential charging the condenser, is adjusted to close each time this potential reaches its peak voltage, which is once every $\frac{1}{120}$ second for 60 cycle power. When the synchronous switch comes to its closed position, a spark will occur at the two gaps SW and S, discharging the energy stored in the condenser through the gaps, resistor R, and inductance L. The current in jumping the gap creates the brightly luminous audible spark. For spectrochemical analysis, the electrodes of gap S are made of the material under test.

Thus, the spark in jumping the gap excites the spectrum of the specimen. The light from this gap enters the spectrograph where it is employed in performing the analysis.

Because it is this spark discharge that produces the spectrum of the sample electrode material, the characteristics of the discharge and their relationship to spectral excitation are all-important to spectrochemical analysis.

This discharge is not constant in character but varies with the electrical parameters of the spark circuit. One combination of capacity C, voltage V, inductance L, and resistance R, will give one type of discharge, while another combination will give another type. A further characteristic of this discharge is its transient nature, each current wave being a rapid pulse of very short duration.

For the calibration shown in FIGURE 1, a spark circuit was employed that had the following parameters:

$V = 30,000$ volts
$C = 0.007$ microfarads
$L = 8.4$ microhenries
$R = 0.3$ ohms The same symbols are used here as are used in the circuit diagram of FIG. 2.

The L shown as 8.4 microhenries is residual inductance contributed by the wiring. R is the residual resistance contributed by the wiring.

Figure 3:
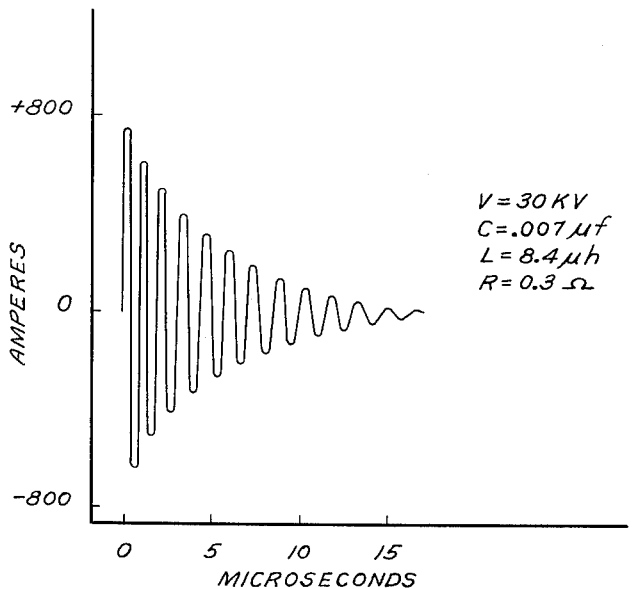
FIG. 3 shows a conventional oscillatory spark current obtained from a typical spectrographic spark source.

The instantaneous spark current produced by the circuit having these component values is shown in FIG. 3. This transient current wave passes through the circuit, and hence gap S, once every $\frac{1}{120}$ second in the case of 60 cycle power. The current rises in the positive or negative direction depending on which half of the power cycle has charged the condenser. This pattern illustrates the fleeting nature of the spark current. For the particular circuit considered here, the current wave lasts only about 15 microseconds. This can be compared with 8333 microseconds, the transient time for one-half wave of 60 cycle power. The pattern also shows the rapid change of the current during the discharge, going from a positive peak value to a negative peak value in about one microsecond.

Even though very short in duration, it is this recurring curret wave that creates the spectral excitation necessary for spectrochemical analysis. Basically then, the characteristics of this transient current influence spectral excitation. Investigation of the factors that affect spectral radiation therefore involves a study of the characteristics of this transient current and their effect on spectral excitation. The main features of this type of wave, as shown by the oscilloscope pattern of FIG. 3, are peak current, frequency, number of oscillations, and duration. Thus, the spark circuit with parameters listed above delivers a current wave that has a peak current of 800 amperes, a frequency of 760 kilocycles, and a duration of 15 microseconds. As described before, however, when this discharge is employed for the excitation of iron and steel, a spectrum is formed that contains a weak, diffused carbon line at 2296.86A which is obscured to a considerable extent by the adjacent interfering lines.

III. Electrical factors that influence spectral excitation

Of extreme importance is the discovery by the inventors that the highest degree of spectral excitation is obtained with a spark discharge characterized by a high peak current of short duration. However, it is not possible to realize much of an improvement in the degree of spectral excitation simply by increasing the current, if, at the same time, the duration is lengthened. In addition, the inventors have found that the oscillatory nature of the current is not essential to high spectral excitation, and therefore to decrease the duration of the discharge, they are able to employ a non-oscillatory, critically damped discharge. With this type of discharge, it is easier to realize the optimum condition of combined high peak current and short duration. The degree of excitation improves progressively with higher peak currents and shorter duration of the spark discharge.

Those skilled in the art will realize that there is a practical limit to the peak current that can be obtained in an electrical spark circuit if its duration is not to exceed a certain limit. This involves the greater amount of stray inductance associated with the larger size condensers necessary to handle the required electric charge.

With these factors in mind, the inventors have been able to produce for use in exciting the spectrum of the specimen for a carbon determination, a spark source that will deliver the current discharge shown in the oscilloscope pattern reproduced in FIG. 4. This current pulse has a peak value of 2300 amperes and a duration of about four (4) microseconds. It is produced with a spark circuit that operates at 20,000 volts and a condenser capacity of 0.25 microfarads. The total resistance (damping) is 6.25 ohms and the stray inductance of the entire circuit is 2.3 microhenries. It is this spark discharge that was used to make the carbon determinations cited hereafter.

IV. Atmosphere surrounding spark discharge

Difficulty in using the 2296.86A carbon line for spectrochemical analysis is caused not only by the closeness of the nearby lines of other elements, but also by the diffuse nature of the carbon 2296.86A line. The broadening of the lines brings them in effect closer together and in some cases they may actually overlap. These lines cannot be separated by a spectrograph of greater linear dispersion because the line widths as viewed spectrographically also increase with greater dispersion.

The diffuse nature of the 2296.86A carbon line is inherently disadvantageous not only because of spectral overlapping of lines, but also because the spread of radiation over a broad band, instead of a narrow one, reduces the detection sensitivity below the desired level. The broadness of the carbon line results from several known causes, namely, its natural breadth, the Doppler effect, and other external effects such as collision damping, asymmetry and pressure shifts, and the Stark effect.

The inventors have discovered a method which decreases the aforementioned external effects on the broadening of the lines. This they accomplish by controlling the atmosphere surrounding the spark discharge. The inventors have been able thereby to determine the optimum conditions of the surrounding atmosphere for the spark discharge.

The common gases which might be used for such atmosphere are N, O, A, Ne, H and He. The gases which might seem most suitable are N, O, A and Ne since they have third ionization potentials exceeding that of carbon which is 83.50 electron volts above the ground state of the neutral atom. Oxygen is not desirable because it readily forms oxides of iron which adversely affect sparking, and also forms deposits on the optical components of the electrode chamber. Neither argon nor neon is usable as an atmosphere because the carbon III line at 2296.86A is not noticeably excited therein. This would seam to limit the choice of atmospheres to nitrogen alone. Fortunately hydrogen and helium are also suited for atmospheres, because they can lose only one or two electrons respectively after which they cannot be further ionized. Hydrogen, because of its explosive nature may not always be as convenient a choice as the other gases because of the added complication of the usual rigid safety precautions necessary when working with explosive gases. Thus, the choice for an ideal atmosphere surrounding the spark electrodes is limited to nitrogen, helium, and, with reservation, hydrogen.

Having thus determined the selection of atmospheres which provide optimum carbon excitation, the inventors have also determined the best combinations of pressure and flow which would reduce spectral line broadening. They have found that by using nitrogen at a pressure of 200 mm. Hg and a flow of 31.8 cubic feet per hour through a 200 ml. sparking chamber, a spectrum of iron and steel is produced having an intense, sharp, and well defined carbon line. In addition, the interfering iron lines adjacent to the carbon line are sufficiently suppressed so that they cannot be seen. The spark used to produce the spectrum is the high current, short duration spark previously described and having the wave form illustrated in FIGURE 4.

A comparable spectrum of iron and steel can also be obtained by using the same spark sources and an atmosphere of helium and nitrogen in the proportions of 26 and 2 cubic feet per hour, respectively, at atmospheric pressure. The noble gas helium alone produces a usable atmosphere for sparking, but when mixed with nitrogen it produces a superior sparking medium. A vacuum system is not needed for maintaining this atmosphere and contamination of the spark from extraneous $CO_2$ is less likely to occur.

The use of hydrogen at 500 mm. Hg or higher pressure also produces high quality iron and steel spectra with a sharp, clearly defined carbon line. It is, of course, necessary to follow rigid safety precautions when using hydrogen because of the explosive nature of the gas.

The atmospheres described above are thus employed by the inventors to reduce the width of the 2296.86A carbon line, thereby making carbon analyses more practical. With the narrowed carbon line and the suppression of interfering adjacent iron lines, the sensitivity of the analytical method is dramatically increased so that concentrations as low as 0.02% carbon are easily measured.

V. Successful spectrochemical procedure for determining carbon

The inventors, then, have devised a method for making sensitive and accurate spectrochemical determinations of carbon in iron and steel. Two new and unique developments have made this analytical procedure possible; namely, a novel high peak current, short-duration spark discharge, and a preselected, controlled atmosphere surrounding the spark discharge. FIGURE 5 illustrates the excellent analytical calibration curve obtained. It is noteworthy that a good rate of change of intensity with a change in carbon content is shown, even with concentrations as low as 0.02% carbon which is as low a concentration as is normally encountered in the commercial metallurgical field. Results of this quality have not heretofore been possible. The dashed line in FIGURE 5 is drawn to illustrate the unsatisfactory type of data previously obtained and illustrated in FIGURE 1.

It is important to mention that this superior type of calibration data is obtained using a commercially available spectrograph having a linear dispersion of 0.53 mm./A. This type of instrument is regularly employed in making spectrochemical determinations of metallic elements in iron and steel.

In addition to carbon, with suitable calibration, it is possible also to determine the metallic elements in a sample using the same excitation conditions.

The electrical circuit which was used to provide a spark discharge for the successful spectra excitation of the sample is the same as shown in FIGURE 2. Component values and the current waveform which were obtained in conjunction with the circuit are illustrated in FIGURE 4. This is a critically damped current wave having a peak value of approximately 2300 amperes and an effective duration of about four (4) microseconds. By careful design the residual and stray inductance was reduced to approximately 2.3 microhenries. A resistor, having less than 0.02 microhenries inductance and capable of handling 11 kilowatts of power, provided the 6.25 ohms resistance necessary for crital damping. Capacitors of 0.25 microfarads capacitance charged to 20,000 peak volts to furnish the high excitation potential were used to excite the steel sample electrodes.

The carefully controlled atmosphere surrounding the sample electrodes is contained in a 200 ml. Pyrex glass chamber having a quartz window for transmission of ultraviolet radiation to the spectrograph. This chamber is designed to permit effective flow of the special atmosphere used across the electrodes. When using nitrogen at 200 mm. Hg pressure a vacuum system automatically maintains this pressure by controlling the flow. A standard ratio proportioner flow meter automatically maintains a mixture of helium and nitrogen in the ratio of 26 to 2 cubic feet per hour when this mixture of gases is used. Contamination of the spark discharge by extraneous carbon from either adsorbed carbon dioxide on the surface of the sparking chamber, or from foreign matter inadvertently introduced, can be reduced to a negligible value by means of an inner glass chamber within the sparking chamber. This inner chamber is degassed before using. It is to be understood, of course, that other arrangements might be devised to accomplish the same ends and the inventors do not wish to be held to specific apparatus. The inner electrode chamber is normally used only if foreign matter contamination is troublesome.

VI. Variations in spectrochemical procedure. The spark current

A successful method for the spectrochemical determination of carbon has been described. The question may now be raised—How much can the method deviate from the stipulated procedure and still give satisfactory results? It was previously stated that the success of this analytical method depends upon two major factors, namely, the use of a high-peak current, short-duration spark, and a specific, controlled atmosphere surrounding the spark discharge. Before proceeding to discuss the variations relating to the spark current, it is important to demonstrate that these two factors are inseparably associated with the successful determination of carbon. Referring to FIGURE 6, it is noted that four spectrochemical analytical calibrations are shown. Curve A is a reproduction of the calibration given in FIGURE 5. Data for this curve was obtained by using both the high-current, short-duration spark and a specific, controlled atmosphere surrounding the spark. Note especially the excellent slope and linearity of the curve. For Curve B, the same type of spark current is employed but with the discharge taking place in air under normal atmospheric conditions. The resulting curve is quite inferior in both slope and lowest limit of sensitivity. Again if a conventional low current oscillatory spark discharge found satisfactory for the determination of metallic elements is used in conjunction with a specific controlled atmosphere, Curve C is obtained. Calibration Curve C also has a very poor slope and sensitivity. The wave form for this spark discharge is shown in FIGURE 3. Finally, when using the same low-current spark in combination with normal atmosphere for the medium around the spark, Curve D can be drawn from the calibration data.

It can be seen by comparing these four calibrations that neither the use of the high-current type discharge alone, Curve B, nor the use of a controlled atmosphere alone, Curve C, will produce the superior type of curve such as Curve A. Curves B and C, can be used for carbon determinations only with samples containing 0.08% or more carbon. This is in contrast to Curve A which enables concentrations as low as 0.02% carbon to be determined. The steep slope of Curves B and C, furthermore, does not favor accurate carbon analyses. Thus, in order to obtain the required sensitivity and accuracy for successful carbon determinations, it is essential that both high-current, short-duration spark discharges, and a specific, controlled atmosphere surrounding the spark be used.

An examination of FIGURE 6 will clearly indicate the startling improvement in the calibration curve when using both the high-peak current, short-duration spark and a specific controlled atmosphere over the use of either condition alone.

Returning now to the original question concerning the extent to which both the current pattern and atmosphere used may vary from the optimum conditions, and still produce acceptable results, we must first consider changes in the spark current. The wave pattern of the spark current found acceptable was illustrated in FIGURE 4. A consideration of the calibration curves shown in FIGURE 6 indicates partially the effect of departure from the established current wave-form of FIGURE 4. Curve C in FIGURE 6, was made with spectra excited by the type of current wave-form illustrated in FIGURE 3.

This pattern is satisfactory for the determination of the metallic elements and is widely used. It is an oscillatory discharge characterized by lower current values and persists for a longer duration than the preferred type in FIGURE 4.

A current wave having a considerably higher peak current, but still long in duration, is shown in FIGURE 7. This is easier to produce than the preferred current wave because no damping resistance is needed. The peak current for this wave is 4500 amperes compared to 2300 amperes for the current wave form of FIGURE 4. The spectrochemical calibration obtained with this very powerful spark discharge is shown in FIGURE 8, together with the preferred curve of FIGURE 5 drawn in as a dashed line. Obviously, this type of current wave gives a calibration that is a considerable improvement over Curve C of FIGURE 6. But even though the sensitivity is good below a concentration of 0.20% carbon, the slope is still not as favorable as the preferred slope of FIGURE 5.

Another unfortunate cosequence of this high powered spark is the excessive fusion of the specimen electrodes which leads to poor analytical precision.

A third possible type of current discharge is illustrated in FIGURE 9. This current pulse has a peak value of 1400 amperes and a duration of about two (2) microseconds. Both of these characteristics are less than the corresponding features of the spark current of FIGURE 4. As can be seen by the spectrochemical calibrations shown in FIGURE 10, this type of discharge gives poor results.

The calibration lacks both sensitivity and slope. Hence, a spark current of short duration will not give satisfactory results unless the peak current is proportionately higher. It can be estimated that a peak current of at least 4000 amperes, instead of 1400 amperes, would have to be realized before a satisfactory carbon calibration would be obtained with a current pulse of only two (2) microseconds duration.

In contrast, the current pulse of FIGURE 11, which has a slightly lower peak current and a slightly longer duration than that of FIGURE 4, does produce very satisfactory results as shown by the analytical calibration of FIGURE 12. The calibration produced with this type of spark current is practically identical to that shown in FIGURE 5 which was obtained with the spark current of FIGURE 4. Thus, this type of discharge also gives accurate and precise carbon determinations even at the lower range of 0.02% C. These current pulses are alike in one respect. They deliver the same amount of power. Graphically, the areas under the current curves of FIGURES 4 and 11 are the same.

A final type of current wave-form that furnishes satisfactory results is illustrated in FIGURE 13. This depicts a partially damped oscillatory spark current. The 2 ohm damping resistance is one third that necessary for critical damping. This current pulse has a peak current of 4000 amperes and a duration of six (6) microseconds. The calibration obtained with this type of current discharge is practically identical to that obtained with the current pulse in FIGURE 4.

From the information presented above, the extent to which spark current characteristics may be varied, and still give accurate and sensitive spectrochemical carbon determinations, can be fairly well predicted. As emphasized earlier, a successful carbon determination depends on the utilization of a spark with a high peak current and short duration. Furthermore, it has been clearly shown by the above data that a higher current alone will not give the desired degree of improvement unless it is accompanied by a conversely shorter duration. Also, the converse is true, a short duration current pulse will not give the best results unless accompanied by a higher current. This can be summarized by stating that optimum results will be obtained if the product of the peak current in amperes and the duration in microseconds has a minimum numerical value of 8,000 to 10,000. This requirement is to be further qualified by the statement that the peak current should always be greater than 1000 to 1200 amperes, and the duration such that the current decays to below 30% of its peak value in 4 to 8 microseconds.

It should be noted that the product of the peak current in amperes and the duration in microseconds does not have a correlation with any actual physical or energy condition, but is merely a convenience or rule of thumb figure. This product, for instance, does not give the power or the ampere seconds, since it is merely the result of multiplying the peak and not the entire current of a current pulse with the duration of the pulse. However, it has been found that certain maximum durations of current and certain minimum peak amperages of current must be met under any conditions to enable a successful spectrographic analysis to be made. The numerical products 8,000 to 10,000 express the relationship of these figures to each other in the range immediately within these absolute minimums and maximums where one condition may or may not meet the necessary criteria depending upon whether the other condition is sufficiently within the maximum or minimum to compensate for its opposite, The minimum numerical products of 8,000 to 10,000 also serve effectively as a qualification throughout the entire operable range of the present invention. Thus a spark having a duration of 1 microsecond would theoretically require a peak current of at least 8,000 amperes to give a satisfactory spark for spectrographic carbon determination provided means were available to produce such a large current with such a stort duration.

It may be said that theoretically there should likewise be a maximum product of these two values beyond which one could not go and still obtain satisfactory results. However, at the present time it has been found technically impossible to determine this upper limit because of the limitation of the electrical components available to construct the circuits. Thus it has not been found possible to damp the current impulses sufficiently to obtain correspondingly short durations at progressively higher amperages. In fact, as has been pointed out before, with the electrical components presently available an increase of the current values to higher figures unavoidably lengthens the current duration beyond the point where the results of the present invention will be obtained. This results from the stray inductance associated with the larger size condensers necessary to handle the required electric charge. Nevertheless, it has been found that if the duration is sufficiently short, or in other words meets the minimum figures set forth above, and the product of the microseconds duration times the peak amperage of the impulse meets the minimum product values set forth above, then the maximum current of the impulse may be increased as far as is consistent with the obtainability of such maximum duration with presently available equipment and excellent results will be obtained. It is believed that such excellent results would continue to the limit governed by such matters as the sample being able to stand the power requirements. For instance, if the current were too great the sample might explode. Stated in another manner, it is believed that the maximum allowable product of the duration of the current impulse times the peak amperage of the impulse, consistent with good results, not only lies beyond the technical feasibility of the presently available circuit components but beyond the ability of the samples to stand the effects of the current pulses and is thus presumably unattainable. Therefore any such maximum may be disregarded so far as affecting the results of the present invention of a method of spectrographic analysis.

VII. *Variations in spectrochemical procedure. The spark atmosphere*

The spark atmosphere surrounding the spark discharge is not quite as critical a factor as the spark current. Fortunately, rather significant changes can be made in the physical constants of the medium surrounding the spark without adversely affecting the results obtained.

Using nitrogen at low pressures for a spark atmosphere the optimum pressure is found to be around 200 mm. Hg. Below 50 mm. Hg pressure the spark behaves too erratically while above 300 mm. Hg pressure the nitrogen atmosphere behaves too much like normal air. FIGURE 14 illustrates the effect of nitrogen pressures. Curves for nitrogen pressures of 240, 220, 200 and 180 mm. Hg are shown. It should be noted that by increasing or decreasing the pressure from the optimum 200 mm. Hg value the slope of the calibration curve is increased with a resultant loss of sensitivity. More important than a strict choice of pressure is a strict adherence to the chosen value for all subsequent determinations.

The effect of changing flow rates upon calibrations made at 200 mm. Hg nitrogen pressure is illustrated in FIGURE 15. Curve (A) was obtained using a flow rate of 3.5 liters per minute of nitrogen. Curve (B) was obtained using a flow rate of 1.5 liters per minute of nitrogen. Curve (C) was obtained with no flow of nitrogen. The inventors controlled the flow rate by regulating the pumping speed of the vacuum system. FIGURE 15 shows that it is also important to maintain any chosen flow rate constant.

Another gas investigated for use as the spark atmosphere was helium. Employing helium at a reduced pressure considerably below 760 mm. (around 200 mm.), the spark behaves very erratically and the intensity of the discharge is extremely low. By increasing the pressure of the gas as high as 600 to 700 mm. Hg a considerable improvement in the spark is obtained. However, even at this pressure it is not completely satisfactory. It is found that by adding traces of nitrogen to the helium, remarkably good analytical results are obtained at atmospheric pressure. It is therefore possible to dispense with the vacuum system under these conditions.

It has been further found that optimum analytical results can be obtained with a mixture of helium and nitrogen flowing through the spark chamber in the proportion of 26 to 2 cubic feet per hour respectively in a 200 ml. spark chamber.

With the nitrogen flow maintained at 2 c.f.h., it is found that slightly better results are obtained as the helium flow is increased from 14 to 28 c.f.h., but no superior effect is observed as helium flow is increased further.

FIGURE 16 illustrates that beyond 28 c.f.h. helium flow the most noticeable feature is a curve shift to higher log intensity values. Curve (A) in FIGURE 16 was obtained using a helium flow of 14 cubic feet per hour, curve (B) was obtained using a helium flow of 26 cubic feet per hour, and curve (C) was obtained using a helium flow of 42 cubic feet per hour.

The effect of slight changes in nitrogen flow, with helium flow constant at 26 c.f.h., can be seen in FIGURE 17. Curve (A) in FIGURE 17 was obtained using a flow of 2 cubic feet per hour of nitrogen, curve (B) was obtained using a flow of 1 cubic foot per hour of nitrogen, and curve (C) was obtained using a flow of 0.5 cubic feet per hour of nitrogen. Increasing the nitrogen flow from 0.5 to 2.0 c.f.h. distinctly shifts the log intensity values towards lower limits. This illustrates the marked effect of nitrogen in helium and emphasizes that accurate control of the flow rates of the binary gaseous mixture is mandatory. Whereas the slopes of the analytical curves remain practically constant in FIGURE 17, it can be seen that to obtain consistently precise results it is necessary to maintain constant gas flow rates and ratios.

Hydrogen as a spark atmosphere behaves similarly to helium. At pressures under 500 mm. Hg the spark discharge is erratic with consequent low intensity. Above 500 mm. Hg the spark discharge improves in appearance. In addition the log intensity ratios become more uniform. The addition of nitrogen to hydrogen results in effects similar to those produced by addition of nitrogen to helium.

It has also been discovered by the inventors that the kind of chamber used to contain the atmosphere, as well as the degree of contaminating carbon surrounding the spark, are of extreme importance. Heretofore, most investigators have not seemed aware of the extent of the contamination problem.

Sparking in the preselected, controlled atmosphere assures relative freedom from atmospheric carbon dioxide affecting analytical results. However, it is desirable to use a properly designed chamber with the selected atmosphere.

It is very difficult to make an accurate, precise carbon analysis of low carbon iron and steel, even with the atmospheres described above, unless the atmosphere is contained in a properly designed chamber to eliminate the effect of extraneous contaminating carbon. Obviously various suitable types of chambers might be devised and the inventors do not limit their process to the use of one type of chamber.

A form of outer electrode chamber designated as a whole as 30 is shown in FIGURE 18. This type of chamber has been found to be suitable to contain the controlled atmosphere needed for successful spectrochemical carbon determinations according to the present invention. In FIGURE 18 a main chamber portion 31 is shown which has been fabricated from a section of approximately 60 mm. diameter Pyrex tubing about 4¼ inches long with one end rounded off as shown at 32. On the top and bottom of the main chamber 31 are two openings of approximately 35 mm. diameter. At these openings two sections of 35 mm. diameter glass tubing have been fused to the main chamber 31 forming a top electrode receiver 33 and a bottom electrode receiver 34. The bottom electrode receiver 34 extends through the bottom wall of the main chamber 31 as illustrated by dashed lines in FIG. 18 and forms the gas-directing orifice extension member 35. On one side of the bottom electrode holder 34 is a gas intake orifice member 36 with a ridged end 37 adapted to securely hold a rubber or plastic hose slipped thereover as is well known in the glass apparatus art. On one side of the top electrode receiver 33 is an exhaust orifice member 38 formed in the same manner as the bottom intake orifice member 36. Numeral 39 designates a quartz glass window mounted in the end of the main electrode chamber 31.

In operation the sample electrodes are placed in conventional electrode holders of a spectrograph which are then slipped into the top and bottom electrode receivers 33 and 34 of the Pyrex electrode chamber so that the sample electrodes come within about 4 mm. or so of meeting in the center of the main chamber 31. It should be noted that once an electrode distance has been established it must be maintained exactly constant for subsequent analyses. Preferably a rubber or other gasket of suitable form will be used to secure a gas tight seal between the Pyrex electrode receivers 33 and 34 with the respective electrode holders of the spectrograph. An atmosphere control system suitably designed to maintain such atmospheric conditions as have been heretofore described as being necessary to good spectrograph results is connected to the inlet and exhaust members 36 and 38 respectively. The gas entering the inlet member 36 passes upwardly around the electrode within the bottom electrode receiver 34 and the gas directing extension 35 of said receiver 34. The said extension 35 acts to direct the flow of gas directly past the electrode gap so that the gas does not tend to spread out and flow around the outer edges of the electrode chamber 31 leaving a dead gas area around the electrode gap. The gas is finally exhausted from the chamber 30 through exhaust orifice member 38.

When it is desired to use an inner electrode chamber within the outer electrode chamber a construction of an inner chamber designed in a similar manner to that shown in FIGURE 19 has been found very effective. The Pyrex glass chamber 40 is fabricated of 25 mm. tubing about 1¼ inches long. A flat top 41 is formed at one end in which is a hole 42 about 5/16 inch in diameter. A similar flat bottom 43 is formed with a similar hole 44 in the center. On the side of the chamber 40 is a hole 45 about 3/8 inch in diameter.

In operation one sample electrode is inserted in hole 44 of the inner electrode chamber 40. Then the entire chamber 40 together with the electrode is slid bodily into the glass electrode receiver 34 of the outer electrode chamber 30 shown in FIGURE 18. The flat bottom 43 of chamber 40 rests upon the electrode holder which is fitted into electrode receiver 34 and thereby the inner electrode chamber 40 is prevented from falling through electrode receiver 34. The other electrode is then slid in from the opposite direction through the remaining glass electrode receiver 33 and the end of the electrode slid into hole 42 in the top of the inner protective chamber 40. The hole 45 in the inner protective chamber 40 is then aligned with the quartz glass window 39 in the outer electrode chamber illustrated in FIGURE 18 in such a manner that light from the energized spark gap between the ends of the electrodes within the chamber 40 is able to pass out through the hole 45 and then through the quartz glass window 39 in the outer electrode chamber and thence into the spectrograph lens system for resolution into its component wave lengths.

As an illustration of the method and typical results obtainable by the use of the method of our invention the following table gives an accurate chemical analysis of several actual samples for which we determined the carbon content by our method of spectrochemical analysis.

TABLE 1

| Sample No. | Percent C | Percent Mn | Percent Si | Percent Ni | Percent Cr | Percent Mo |
|---|---|---|---|---|---|---|
| 163 | .018 | .03 | .16 | | | |
| 166 | .070 | .18 | .19 | | .02 | |
| 167 | .100 | .31 | .20 | .01 | .02 | .01 |
| 168 | .164 | .15 | .22 | .02 | .01 | .01 |

These were conventional spectrochemical pin samples approximately 2 inches long by 7/32 inch in diameter.

A series of ten spectrochemical analyses for carbon were run on each sample over a period of 9 days using a standard commercially available spectrograph having a linear dispersion of 0.53 mm./A and operated in accordance with the set of physical spark conditions typical of one variation of our method of spectrochemical analysis.

The sparking circuit for the excitation of the samples had the following parameters.

$V = 20{,}000$ volts
$C = 0.25$ microfarads
$L = 2.3$ microhenries
$R = 6.25$ ohms It will be recognized that these are the circuit parameters which will produce a spark having a peak pulse value of 2300 amperes and a duration of about four (4) microsecond as previously explained.

An appropriate number of sample electrodes were formed from each sample. For each test run made, two of these were placed in conventional electrode holders which were then slipped into the top and bottom electrode receivers of a 200 ml. electrode chamber as previously described and the electrodes connected into the sparking circuit.

The 200 ml. electrode chamber was then connected to a gas system including a standard ratio proportioner flow meter which automatically maintained a mixed flow of helium and nitrogen gas through the 200 ml. chamber in the proportion of 26 cubic feet per hour of helium and 2 cubic feet per hour of nitrogen. The gas flow was started and the chamber purged for about a minute to discharge any extraneous gases such as carbon dioxide and to bring the system to equilibrium. The switch in the sparking circuit was then closed and a 180 second warm-up period initiated to bring the sparking conditions to an equilibrium before the shutter was opened to expose the photographic plate of the spectrograph to the spectral radiation produced by the electric discharge between the sample electrodes.

The following table tabulates the results of these thirty spectrochemical analyses in percent carbon and deviation. The spectrochemical analyses given in the table were obtained using the 2295.7A FeIII line as a reference line for comparison with the 2296.86A CIII line.

TABLE 2

| Sample Run | Test Sample Number | | | | | | | |
|---|---|---|---|---|---|---|---|---|
| | 163 | | 166 | | 167 | | 168 | |
| | Percent C | $d$ | Percent C | $d$ | Percent C | $d$ | Percent C | $d$ |
| 1 | .0200 | .0019 | .0690 | .0004 | .106 | .006 | .160 | .006 |
| 2 | .0201 | .0021 | .0705 | .0019 | .098 | .002 | .158 | .008 |
| 3 | .0176 | .0004 | .0650 | .0036 | .102 | .002 | .059 | .007 |
| 4 | .0182 | .002 | .0635 | .0051 | .093 | .007 | .172 | .006 |
| 5 | .0173 | .0007 | .0735 | .0049 | .106 | .006 | .159 | .007 |
| 6 | .0165 | .0015 | .0600 | .0086 | .096 | .004 | .167 | .001 |
| 7 | .0199 | .0019 | .0735 | .0049 | .098 | .002 | .185 | .019 |
| 8 | .0181 | .0001 | .0705 | .0019 | .099 | .001 | .165 | .001 |
| 9 | .0158 | .0022 | .0720 | .0034 | .102 | .002 | .160 | .006 |
| 10 | .0176 | .0006 | .0690 | .0004 | .103 | .003 | .175 | .009 |
| Average of C | | .0181 | | .0686 | | .100 | | .166 |
| St. Deviation | | .0015 | | .0045 | | .0043 | | .0089 |
| Coef. of Variation, percent | | 8.3 | | 6.6 | | 4.3 | | 5.4 |

The deviation figures ($d$) are the deviation of each sample run from the average spectrochemical results of ten runs on identical samples. These figures indicate the reproducibility of the results. The average percent carbon for ten runs or the percent carbon of any individual spectrochemical analysis run, may be compared with the accurate chemical analyses for carbon tabulated in Table 2 for the respective samples 163, 166, 167 and 168.

It will be recognized that these are very satisfactory figures for the determination of carbon in steel. These figures are particularly impressive when it is considered that heretofore, so far as the present inventors are aware, it was impossible to determine carbon in steel within these ranges by spectrochemical means with sufficient accuracy to be meaningful even for comparison. Thus no previous spectrochemical analysis results within these ranges can be presented for comparison with the very superior analysis data set forth above.

Although we have thus described our invention hereinabove in considerable detail, we do not wish to be limited narrowly to the exact and specific particulars disclosed, but we may also use such substitutes, modifications or equivalents as are included within the scope and spirit of the invention or pointed out in the appended claims.

We claim:

1. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values being between 8000 and 10,000, enclosing said spark gap in a controlled atmosphere consisting of at least one gas of the group of gases consisting of nitrogen, helium, and hydrogen, and thereby suitably exciting the 2296.86A CIII line of the carbon spectrum for spectrochemical analysis of metal for carbon.

2. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values being between 8,000 and 10,000, enclosing said spark gap in an atmosphere consisting of hydrogen and controlling the hydrogen pressure in the range of 500 to 770 mm. Hg.

3. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values being between 8,000 and 10,000, enclosing said spark gap in an atmosphere consisting of helium and nitrogen, controlling the atmosphere at a pressure in the range of 600 to 770 mm. Hg. and maintaining a flow of gases in the electrode area equivalent to 10 to 36 cubic feet per hour of helium and 1 to 3 cubic feet per hour of nitrogen through a 200 ml. chamber.

4. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values being between 8,000 and 10,000, enclosing said spark gap in an atmosphere consisting of nitrogen, controlling the nitrogen at a pressure in the range of 50 to 300 mm. Hg and maintaining a nitrogen flow equivalent to 8 cubic feet per hour to 35 cubic feet per hour through a 200 ml. chamber.

5. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values being between 8,000 and 10,000, enclosing said spark gap in an atmosphere consisting of nitrogen, and controlling the nitrogen at a pressure in the range of 50 to 300 mm. Hg.

6. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values falling between 8,000 and 10,000, enclosing said spark gap in an atmosphere consisting of helium, controlling the helium at a pressure in the range of 600 to 770 mm. Hg and maintaining a gas flow through the surrounding electrode space equal to a flow in the range of 10 to 36 cubic feet per hour of helium through a 200 ml. chamber.

7. Method of spectrochemical analysis of a metal sample comprising placing said sample in an atmosphere consisting of at least one gas selected from the group of gases consisting of nitrogen, helium and hydrogen and subjecting the sample to a succession of electric spark discharges, each spark having a peak current intensity of not less than 1000 amperes and a duration of not more than 15 microseconds.

8. A method of spectrochemical analysis of a sample of metal comprising making said sample an electrode of a spark gap in an electric sparking circuit and causing a succession of short intense sparks to jump said spark gap, each of said individual sparks having a peak current of a least 1000 amperes and a duration such that the spark current falls to below 30% of the peak current value in not more than 8 microseconds, the minimum numerical product of said current and duration values being between 8,000 and 10,000, enclosing said spark gap in a controlled atmosphere consisting of at least one of the group of gases consisting of nitrogen, helium, and hydrogen, and maintaining the pressures of the respective gases within the ranges of 50 to 300 mm. Hg of nitrogen, 600 to 770 mm. Hg of helium and a helium-nitrogen mixture, and 500 to 770 mm. Hg of hydrogen.

9. A method of spectrochemical analysis of a sample of metal comprising making said sample an electrode of a spark gap in an electric sparking circuit and causing a succession of short intense sparks to jump said spark gap each of said individual sparks having a peak current of at least 1000 amperes and a duration such that the spark current falls to below 30% of the peak current value in not more than 8 microseconds, the minimum numerical product of said current and duration values being between 8,000 and 10,000, enclosing said spark gap in a controlled atmosphere consisting of at least one of the group of gases consisting of nitrogen, helium, and hydrogen, and maintaining gas flow rates for the respective gases equivalent to a flow rate through a 200 ml. chamber of 8 to 35 cubic feet per hour of nitrogen, 10 to 36 cubic feet per hour of helium, and 10 to 36 cubic feet per hour of hydrogen.

10. A method of spectrochemical analysis of a sample of metal comprising making said sample an electrode of a spark gap in an electric sparking circuit and causing a succession of short intense sparks to jump said spark gap, each of said individual sparks having a peak current of at least 1000 amperes and a duration such that the spark current falls to below 30% of the peak current value in not more than 8 microseconds, the minimum numerical product of said current and duration values being between 8,000 and 10,000, enclosing said spark gap in a controlled atmosphere consisting of at least one of the group of gases consisting of nitrogen, helium, and hydrogen, maintaining the pressures of the respective gases within the ranges of 50 to 300 mm. Hg of nitrogen, 600 to 700 mm. Hg of helium, and 500 to 770 mm. Hg of hydrogen and maintaining a gas flow of the respective gases through the surrounding electrode space equal to a flow through a 200 ml. chamber of 8 to 35 cubic feet per hour of nitrogen, and 10 to 36 cubic feet per hour of helium and hydrogen.

References Cited by the Examiner

UNITED STATES PATENTS

| | | | |
|---|---|---|---|
| 2,324,899 | 7/1943 | Arthur | 315—237 |
| 2,391,225 | 12/1945 | Clark | 315—241 |
| 2,414,363 | 1/1947 | Dietert et al. | 315—237 |
| 2,895,078 | 7/1959 | Polster | 315—241 |

GEORGE N. WESTBY, *Primary Examiner.*

RALPH G. NILSON, ARTHUR GAUSS, *Examiners.*

C. R. CAMPBELL, *Assistant Examiner.*